(12) United States Patent
Toda et al.

(10) Patent No.: US 7,953,014 B2
(45) Date of Patent: May 31, 2011

(54) FPGA-BASED NETWORK DEVICE TESTING EQUIPMENT FOR HIGH LOAD TESTING

(75) Inventors: Kenji Toda, Tsukuba (JP); Toshihiro Katashita, Tsukuba (JP); Kazumi Sakamaki, Kita-ku (JP); Takeshi Inui, Kita-ku (JP); Mitsugu Nagoya, Chiyoda-ku (JP); Yasunori Terashima, Shinagawa-ku (JP)

(73) Assignees: National Institute of Advanced Industrial Science and Technology, Tokyo (JP); DUAXES Corporation, Tokyo (JP); BITS Co., Ltd., Tokyo (JP)

( * ) Notice: Subject to any disclaimer, the term of this patent is extended or adjusted under 35 U.S.C. 154(b) by 990 days.

(21) Appl. No.: 11/368,415

(22) Filed: Mar. 7, 2006

(65) Prior Publication Data

US 2007/0067130 A1 Mar. 22, 2007

(30) Foreign Application Priority Data

Sep. 16, 2005 (JP) ................................. 2005-271060

(51) Int. Cl.
*H04L 12/26* (2006.01)
*G01R 31/08* (2006.01)
*G06F 11/00* (2006.01)
*G06F 7/04* (2006.01)
*H04L 29/08* (2006.01)

(52) U.S. Cl. ............ 370/242; 370/248; 714/32; 714/45; 713/161; 713/181; 726/13; 726/22; 709/224

(58) Field of Classification Search ............ 370/395.32, 370/392, 229, 230–232, 241–252, 349, 351, 370/389, 394, 471–477; 709/224–228, 236; 726/13, 22–25; 714/1, 4, 733, 704, 25, 32, 714/40, 45, 712, 741, 742; 455/423; 702/123; 713/153–154, 160, 161, 178–181

See application file for complete search history.

(56) References Cited

U.S. PATENT DOCUMENTS 6,496,971 B1 * 12/2002 Lesea et al. ..................... 716/16
(Continued)

FOREIGN PATENT DOCUMENTS

JP 04-328926 11/1992
(Continued)

OTHER PUBLICATIONS

S. Ohta, et al., "Passive Performance Measurement for IP Networks with Using Hash-Based Packet Feature Extraction", Proceedings of the 2003 IEICE General Conference, Mar. 2003, p. 271, B-7-11 (with partial English translation).

(Continued)

*Primary Examiner* — Aung S Moe
*Assistant Examiner* — Habte Mered
(74) *Attorney, Agent, or Firm* — Oblon, Spivak, McClelland, Maier & Neustadt, L.L.P.

(57) ABSTRACT

Network device testing equipment capable of testing network devices using small size packets and for a transferring ability and a filtering ability at a media speed is described. A configuration is adopted in which a Field Programmable Gate Array (FPGA) included in a transmitter or receiver on one or both of transmitting and receiving sides is connected directly to a physical layer chip of a network and computers on both the transmitting and receiving sides are connected thereto. Each of the FPGAs of the transmitter and receiver has a circuit which has an integrated function of transmitting a packet pattern generation function and a packet-receiving function, thereby enabling a test and an inspection in real time. When inspecting the filtering function, a hash table storing therein a hash value and a list of occurrence frequencies for hash values is utilized. In order to avoid the hash values of different packets from having a same value, the hash function is configured so as to avoid that the same hash value is given to different packets or, when packet values have a common hash value, the packet is re-shaped into a packet having a different hash value.

10 Claims, 13 Drawing Sheets

U.S. PATENT DOCUMENTS

| | | | |
|---|---|---|---|
| 7,328,349 B2 * | 2/2008 | Milliken | 713/181 |
| 2003/0172177 A1 * | 9/2003 | Kersley et al. | 709/236 |
| 2003/0223367 A1 * | 12/2003 | Shay et al. | 370/231 |
| 2007/0121516 A1 * | 5/2007 | Hannel et al. | 370/241 |

FOREIGN PATENT DOCUMENTS

| | | |
|---|---|---|
| JP | 10-271184 | 10/1998 |
| JP | 2001-298428 | 10/2001 |
| JP | 2002-152317 | 5/2002 |
| JP | 2002-344448 | 11/2002 |
| JP | 2004-242197 | 8/2004 |

OTHER PUBLICATIONS

S. Ohta, et al., "Hash-Based Packet Feature Extraction Applied to Passive Performance Measurement for IP Network", Technical Report of IEICE, May 2004, vol. 104, No. 73, pp. 19-24 (with English Abstract).

T. Katashita, et al., "An Experimental Circuit for the Evaluation of Network Filtering Systems", Technical Report of IEICE, Mar. 10, 2005, vol. 104, No. 737, pp. 49-53 (with English Abstract).

* cited by examiner

FPGA-BASED NETWORK DEVICE TESTING EQUIPMENT FOR HIGH LOAD TESTING

BACKGROUND OF THE INVENTION

1. Field of the Invention

The present invention relates to network device testing equipment for testing network devices used in a network and related fields including Ethernet communications and Internet.

2. Description of the Prior Art

To filter out computer viruses or unwanted URLs (Uniform Resource Locators) in the network, it is necessary to confirm both the filtering function and the filtering performance that discriminates packets to be blocked and packets not to be blocked. In particular, the behavior of the network device is important when having received a DoS attack (Denial of Service Attack) that is known for modifying the function return address to invade by perpetually sending small-sized packets until the packet buffer overflows.

Personal computers are often used in equipment for testing network devices taking advantage of its versatility and the communication function installed in it. The equipment suffers restrictions from MAC (Media Access Control layer: a layer for controlling transmission and receipt of frames reciprocated through a network) chips in controlling network protocols. Such restrictions cause problems in high load tests using a small packet. In testing a filtering apparatus, it is necessary to count packets that fail to pass while desired to pass and packets that pass while desired to be filtered out. In the testing, some cautions have to be paid for arrival sequence of the packet desired not to be filtered out, because the arrival order is possibly changed by the filtering apparatus. When all packets transmitted are recorded and compared with the received packets, the functions of the filtering apparatus can be examined. However, the following problems are imposed.

(P1) The required memory size for recording the packets becomes huge.

(P2) A separate communication channel having the same bandwidth as the Ethernet path to be examined is required for transferring the transmitted packet data to the examination section of the receiver.

(P3) The procedure to compare the transmitted packets with the received packets requires a large scale of circuits and is time-consuming.

In the conventional technique using a personal computer, particularly in the case of small-sized packets, the testable communication speed (throughput) is not sufficiently high to test at full media speed (speed of the physical layer of a network, the Ethernet includes the standards using an electric wire or optical fiber of 10 Mbps, 100 Mbps, 1 Gpbs and 10 Gpbs). Though there is a performance measuring apparatus using ASICs (Application Specific Integrated Circuits) for a network device, since specifically designed chips are required, the performance measuring apparatus is inclined to be very expensive in spite of low degree of freedom of the test items.

SUMMARY OF THE INVENTION

The present invention makes it easy to exert a high load in a test using a small packet, thereby making it possible to perform tests at a sufficiently high media speed (speed of the physical layer of 1 Gpbs or 10 Gpbs, for example).

This invention makes it possible to measure the performance of the network device at present in an ultimate condition applicable also to the Ethernet exceeding 10 Gpbs. Furthermore, since the present invention makes it possible to induce a DoS attack, it can inspect whether or not a device under measurement has a fragile nature in this aspect.

As a solution to the problems of exerting a high load test using small packet, the present invention proposes the followings. To be specific, a transmitter or receiver on one or both of transmitting and receiving sides includes circuits that are configured on a Field Programmable Gate Array (FPGA) and are directly connected to a physical layer chip (PHY chip) of a network and a host PC (Personal Computer). And each of the FPGAs of the transmitter and the receiver has a circuit which has a integrated function of transmitting a packet pattern generation function and a packet-receiving function, thereby enabling a test and an inspection in real time. The packet-receiving function is configured for filtering confirmation.

Also, the present invention proposes the following as a method for realizing the filtering function inspection. That is, as a solution to the aforementioned problems, i.e. P1, P2 and P3, the present invention proposes an inspection method using a hash function and a hash table. That is to say, when transmitting a packet, a hash value of the sent packet is calculated using the hash function and recorded on the hash table by incrementing a counter of the hash value by 1. What is most important in the operation here is to avoid the same hash value from being given to different packets. Specifically, the hash function is configured so as to give different hash values for different packets or, when the hash function conflicts between packets belonging to a same hash value, the packet is reproduced so as to have a different hash value.

In view of the above, the network device testing equipment according to the present invention has a configuration which comprises a transmitter, a receiver, a transmission channel connecting the transmitter, a device to be inspected and the receiver, means for setting inspection packets and a parameter on the transmitter, means for comparing data from the transmitter and receiver, means for calculating inspection table, means for collecting inspection tables and means for calculating and outputting inspection results. A series of packets are produced directly from an FPGA in the transmitter connected to a PHY chip of a network. This configuration provides high-speed characteristics and controllability of a packet configuration and inter-packet gap. When a device to be tested can receive a plurality of inputs, a test under a modified timing between the plural inputs can also be performed.

In the present invention, the transmitter includes a plurality of field programmable gate arrays connected to the physical layer chip to switch the arrays or a partially rewritable field programmable gate array to switch a circuit for packet sent, thereby enabling various kinds of tests, even if more complicated, to be performed.

In the present invention, the field programmable gate array is provided with a packet generation section and a received packet checkup section to have an inspection function. With this, an inspection at the media speed can be attained. In the general-purpose systems, such as a personal computer, since there are overheads of software, such as OS, inspection programs, etc. and overheads in the MAC chips (particularly, in a small packet of 1 G bps or more in which overheads increase), an inspection at the media speed is difficult to perform.

Also in the present invention, the transmitter comprises means for randomizing frame data, means for calculating hash values of the transmitted data and means for comparing the frequencies on the transmitting and receiving sides every one packet to confirm the presence and absence of the arrival of the packets. In the case of the packets to be filtered, only confirmation of not receiving the filtered packets will be required. This is easy to perform.

In the present invention, when different packets conflict by belonging to the same hash value, the conflict is removed by means for so altering the internal structure of one of the packets by altering its non-filtering key fields, means for adding a new part to the packet or means for altering a hash function so that different packets may have different hash values. With this removal of conflict, even the case where the order of arrival of the packets is changed by the operation of the network communication device to be measured can be dealt with. Since it is unnecessary to compare the transmitted packets retained by a receiver with the received packets, the circuit including a memory can be simply constructed and operated at high speed.

In the present invention, the FPGA can be substituted by a device including a circuit that can be programmed by a function block as a programming unit or using a semiconductor integrated circuit constituting an ASIC (Application Specific Integrated Circuit). Though the FPGA can program a logic circuit as a unit of a low-level circuit element, when only changes of parameters suffice, with the circuit per se fixed without any modification, an ASIC is used as the circuit to materialize the same degree of performance. The materialization is easy to attain. In the case of requiring more flexibility than the ASIC, a device capable being programmed at a function block level can also be utilized The characteristic features and advantages of the present invention will be described in detail herein below with reference to the accompanying drawings.

DESCRIPTION OF THE PREFERRED EMBODIMENTS

As a solution to a high-load problem caused by small packets, a configuration is adopted in which a Field Programmable Gate Array (FPGA) included in a transmitter or receiver on one or both of transmitting and receiving sides is connected directly to a physical layer (PHY) chip of a network and PCs on both the transmitting and receiving sides are connected to the FPGA. In this configuration, a circuit having a consolidated function in a pair of a packet sending pattern production function and a packet-receiving function is set in each of the FPGAs of the transmitter and receiver. This configuration is intended for performing a real time test or inspection.

Figure 11:
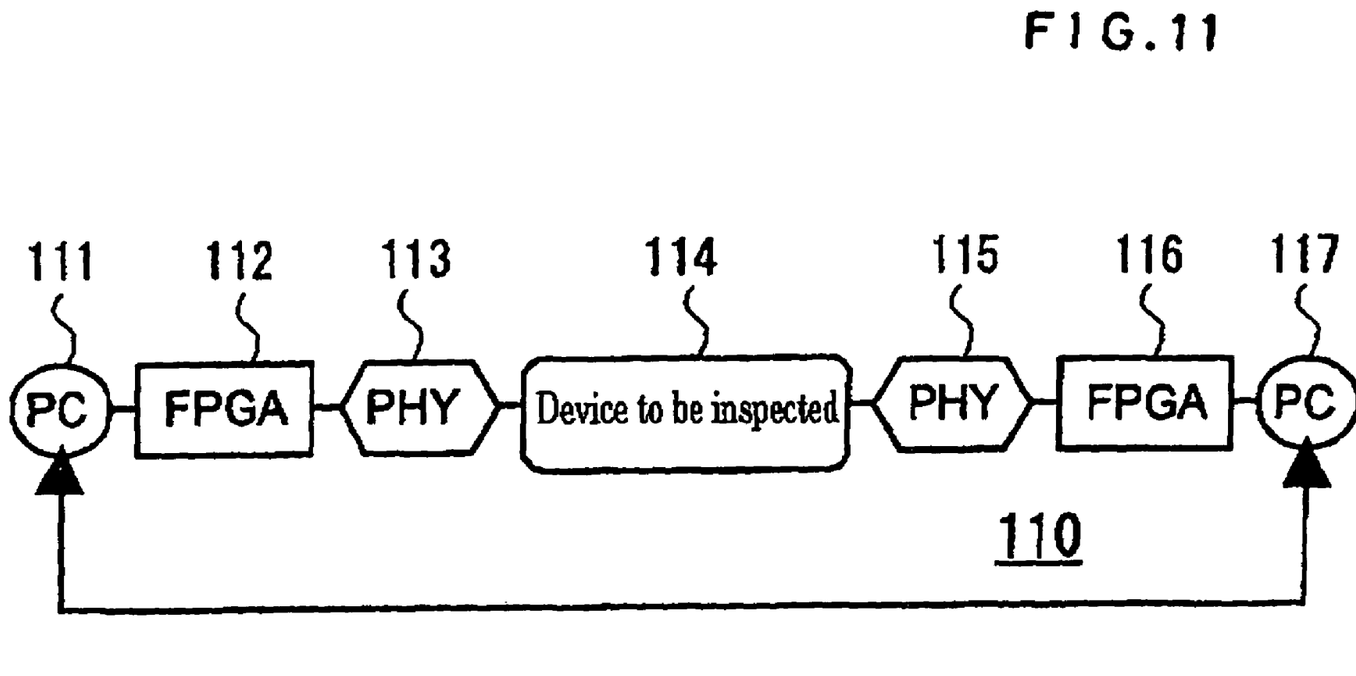
FIG. 11 is a block diagram showing a configuration example in the case of performing comparison and inspection between PCs.
Figure 12:
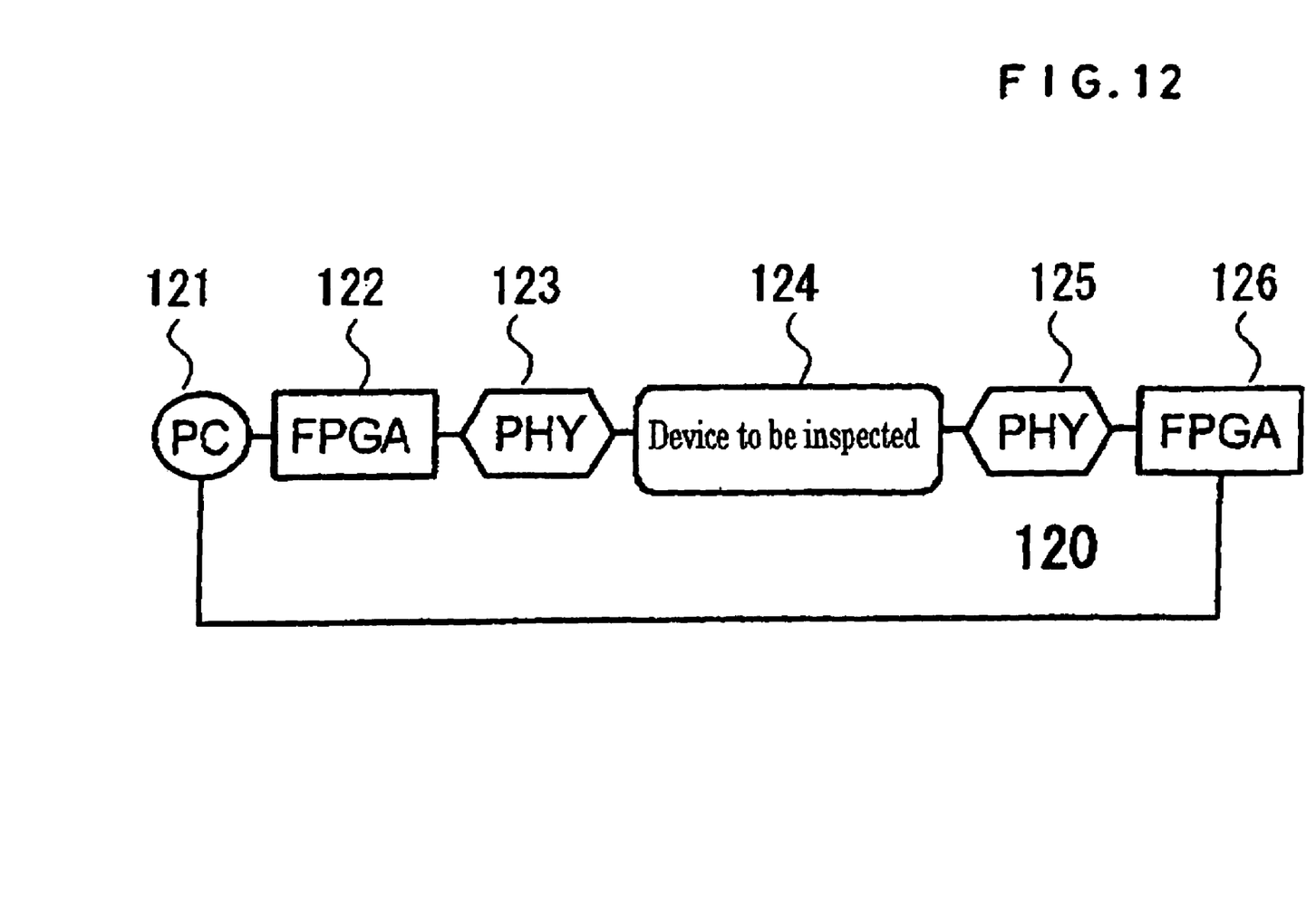
FIG. 12 is a block diagram showing a configuration example in the case of performing comparison and inspection between FPGAs.
Figure 13:
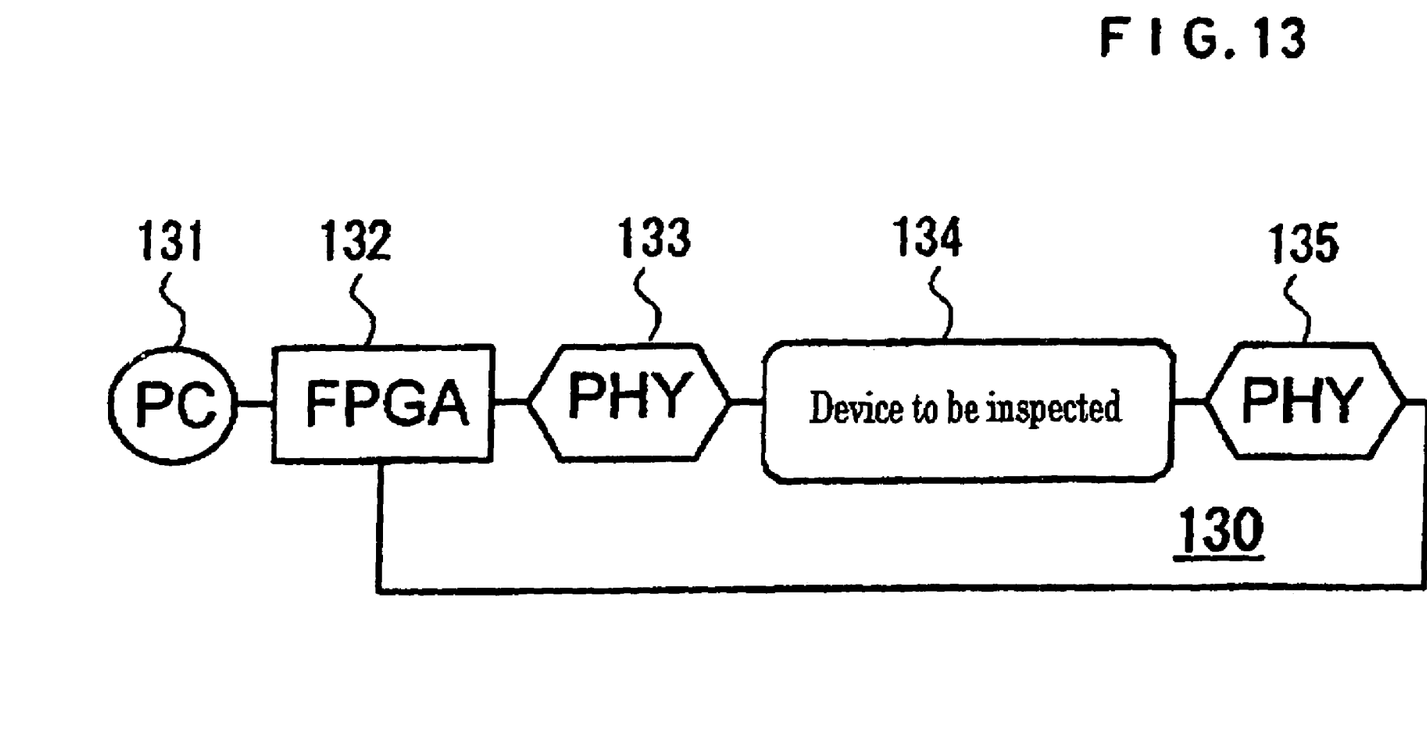
FIG. 13 is a block diagram showing a configuration example in the case of configuring a transmitting circuit and a receiving circuit in an FPGA.

The configurations of inspection devices 110, 120 and 130 are shown in FIGS. 11, 12 and 13, respectively. The portion denoted by PC 131 is a device for rewriting and controlling an FPGA, such as a personal computer. The portion denoted by FPGA is a field programmable gate array.

FIG. 11 shows a configuration example in the case of performing comparison and inspection between PCs 111 and 117, in which the PC 111 is used to set an FPGA 112 that supplies data via a PHY 113 on a network to a device 114 under test or inspection. An FPGA 116 receives the data from the device via a PHY 115. The PC 117 is used to set the FPGA 116 and transmit the received data to the PC 111, where the transmitted data and received data are compared to detect errors.

FIG. 12 shows a configuration example in the case of performing comparison and inspection between FPGAs 122 and 126. A PC 121 is used to set the FPGAs 22 and 126. Data are supplied via a PHY 123 to a device 124 under test and inspection. The FPGA 126 receives the data from the device via a PHY 125 and transmits the received data to the PC 121, where the transmitted data and received data are compared to detect errors.

FIG. 13 shows a configuration example in the case of setting a transmitting circuit and a receiving circuit in a single FPGA 132. APC 131 is used to set the FPGA 132. Data are supplied via a PHY 133 on a network to a device 134 under test and inspection. The FPGA 132 receives the data from the device via a PHY 135 and transmits the received data to the PC 131, where the transmitted data and received data are compared to detect errors.

Here, in FIG. 11, 12 or 13, the number of input ports (While a PHY chip is included, the FPGA and PC are also included when necessary) and the number of output ports (similar to the input ports) may be plural.

Also in FIG. 11, 12 or 13, the portion of the FPGA may be made plural, thereby enabling inspection of devices having multiple input/output ports.

Furthermore, in the configuration examples mentioned above, an LSI, such as an ASIC, can be substituted for the portion of the FPGA Also, the portion of the PC may be built in the FPGA or ASIC.

The present invention also discloses an inspection method utilizing a hash function and a hash table as a method for materializing a filtering inspection function. To be specific, the method comprises the steps of calculating a hash value of a packet transmitted using a hash function on a packet transmission side, recording the value on the hash table, adding 1 to a counter of the value and recording the occurrence frequency of hash values. What is important in this operation is to make the hash values of packets different from each other. Specifically, a hash function is constituted so that the hash values of different packets do not belong to a same hash value. This condition is realized by a hash function being defined so as to give a different hash value for different packet, or a packet being reshaped to avoid having a same hash value when the hash values are equal for different two packets. With this, as each of the packets has one to one correspondence with each of hash values to confirm a complete receiving of sent packets, it is sufficient to confirm the coincidence between occurrence frequencies of hash values defined by a hash table on the transmitting side and on the receiving side. In the case where a packet is partially changed or a packet per se disappears, since the occurrence frequencies of the hash values on the transmitting side and on the receiving side are not the same, the hash value, then the packet, being implicated into some incident, can be detected.

The candidate packets to be transmitted may be prepared in advance or on the spot. In the above preparation, the packets are prepared so that different packets have different hash values. Therefore, by transferring only the information on the hash table of the packets launched from the transmitting side, i.e. the packet number of each hash value, and the data on the packets to be filtered or not to the receiving side, it is possible to inspect whether the packets are correctly filtered out from the whole packet data for a test, irrespective of the arrival order of the packets.

Strictly, it is conceivable that the original packet and the altered packet happen to have the same hash values. The altered packet is caused by for example an incident alteration on transmission channel and an alteration by rewriting by the equipment. It is also conceivable that occurrence frequencies kept unchanged by a mutual exchange. The mutual exchange may be caused in a way as a plurality of packets are altered and, though their hash values differ from those of the initial packets, the occurrence counts of hash value of the hash table happen to complete the hash value of the altered other packets and, as a result, the hash values on the hash table after completion are in agreement with the normal hash values. However, since there is a very small possibility of the packets altered being not detected by a cyclic redundancy checksum bit of an Ethernet packet and being applied to the above cases, it is believed that no problem will arise from a practical standpoint. From a point of view for implementation, since the hash table has a small size comparing to the case to record the entire packets, a reduction is expected in the amount of data to be transferred from the transmitting section to the receiving section.

EXAMPLE 1

In the following description, test equipment having the following function is intended.
1) Measurement of Throughput and Average Packet Length:
   A function to deal with any packet from a packet of 64 bites to a jumbo packet and to measure the average packet length is mounted. In any packet size, it is possible to measure the throughput up to the theoretical maximum value.
2) Inspection of Frame-Transmitting and Frame-Receiving Sequences:
   A function to inspect any frame sequence including an Inter Frame Gap (IFG) and a preamble is mounted. It is possible to accurately grasp the behavior of a network device at the time of error occurrence.

3) Verification of URL Filtering Function:
   A function to verify the behavior of a URL filter used to restrict accessing to malicious homepages is mounted. It is possible to inspect high-speed filtering function at low realization cost using a hash table. It is also possible to measure the throughput while inspecting the filtering function.

Though the devices will be described in respective functions in the following, since each of these devices can be realized using same hardware, it is easy to construct test equipment having all the functions integrated.
1) A device for verifying a URL filtering function.
2) A device for inspecting frame-transmitting and frame-receiving sequences.
3) A device for measuring a throughput and an average packet length.

Figure 1:
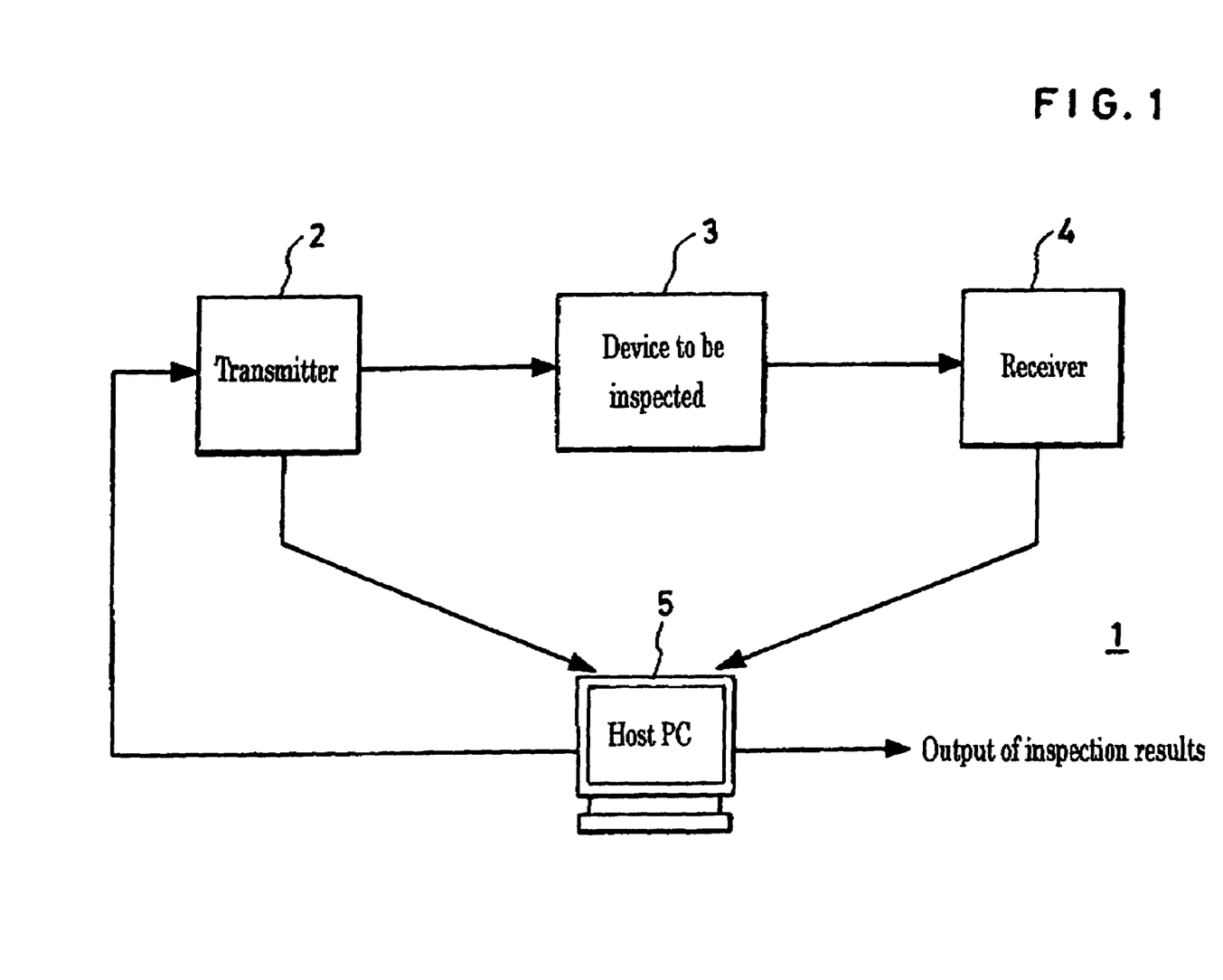
FIG. 1 is a schematic diagram showing a verification system for the functions of a URL filtering device.

FIG. 1 shows a verification system 1 for verifying the functions of a URL filtering device, particularly a verification system using a host PC to compare and verify inspection tables (i.e. hash tables). It comprises a test frame transmitter 2, a receiver 4 and the host PC 5 to verify a function of network equipment of a URL filtering device and a filtering function. The host PC 5 sets inspection packets and parameters of the transmitter 2 and compares data from the transmitter 2 and receiver 4 to calculate and fill inspection tables. It also calculates and outputs inspection results.

In FIG. 1, a kind of frame data is randomly selected from plural kinds of frame data (inspection packets) set in advance in the transmitter 2, and the selected frame data are sent. The sent frame data pass through a device 3 to be inspected and are received by the receiver 4. In this configuration, hash values of the sent packet of the transmitter 2 are calculated, and an accumulation count of a column having the hash values as addresses of a table is incremented. Similarly on the side of the receiver 4, hash values of the received packets are calculated to renew a table. The host PC 5 is used to compare the tables of the transmitter 2 and receiver 4, and thereby used to verify whether the frame data are correctly transmitted and received.

Special frames representing "verification start" and "completion" of types not generally used in the transmission are set, and they are transmitted and received before starting verifying the hash tables. Each frame data set in the transmitter 2 but filtered with the URL filtering device 1 is set with a special flag in the host PC 5, and the hash value of the data with the flag is not calculated on the transmitter side. With this, it is possible to verify the URL filtering function.

Figure 2:
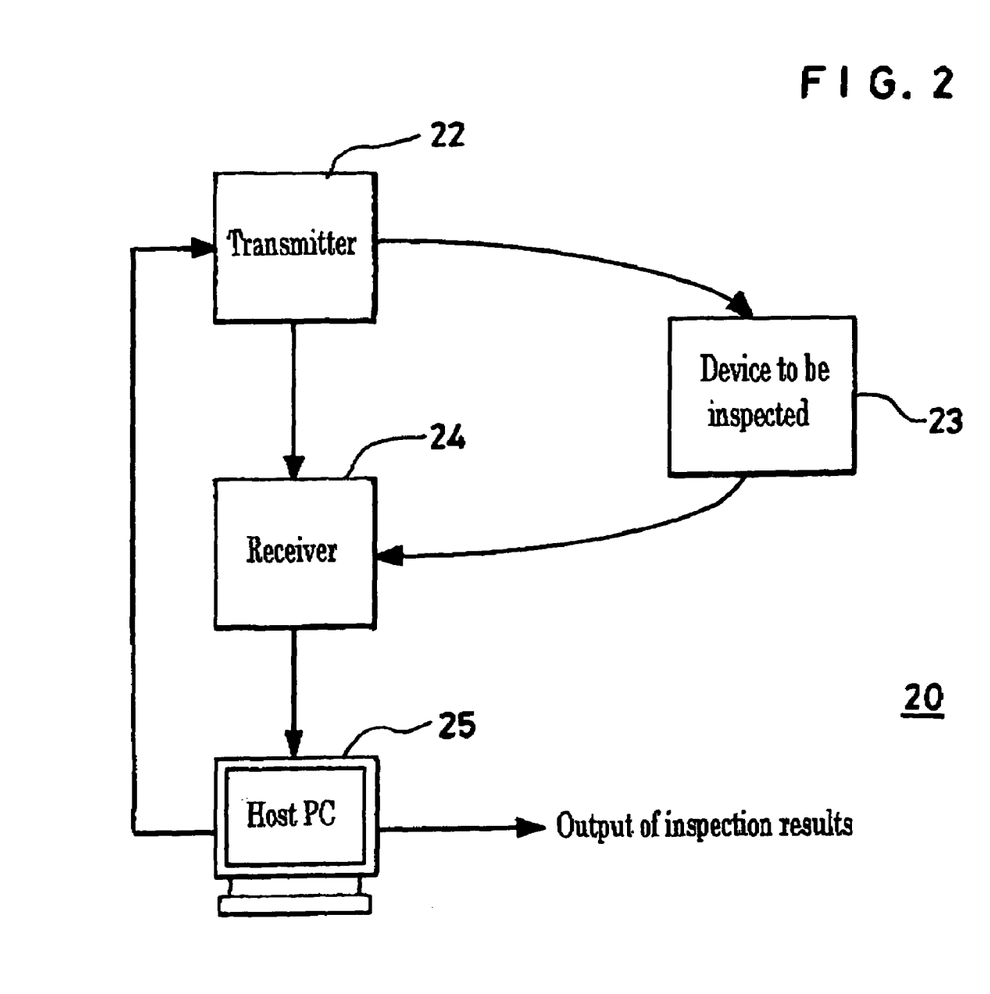
FIG. 2 is a schematic diagram showing a verification system for the functions of a URL filtering device in the case of verifying an inspection table using FPGA(s).

Also as shown in FIG. 2, it is possible to treat the inspection tables with an FPGA and also to perform an intermittent test. FIG. 2 is a schematic diagram showing a verification system 20 for the functions of a URL filtering device in the case of verifying an inspection table using a FPGA. A host PC 25 sets inspection packets and parameters of a transmitter 22, and a receiver 24 compares data from the transmitter 22 and data from a device 23 to calculate and fill inspection tables. The host PC 25 also receives data from the receiver 24 and calculates and outputs inspection results.

Figure 3:
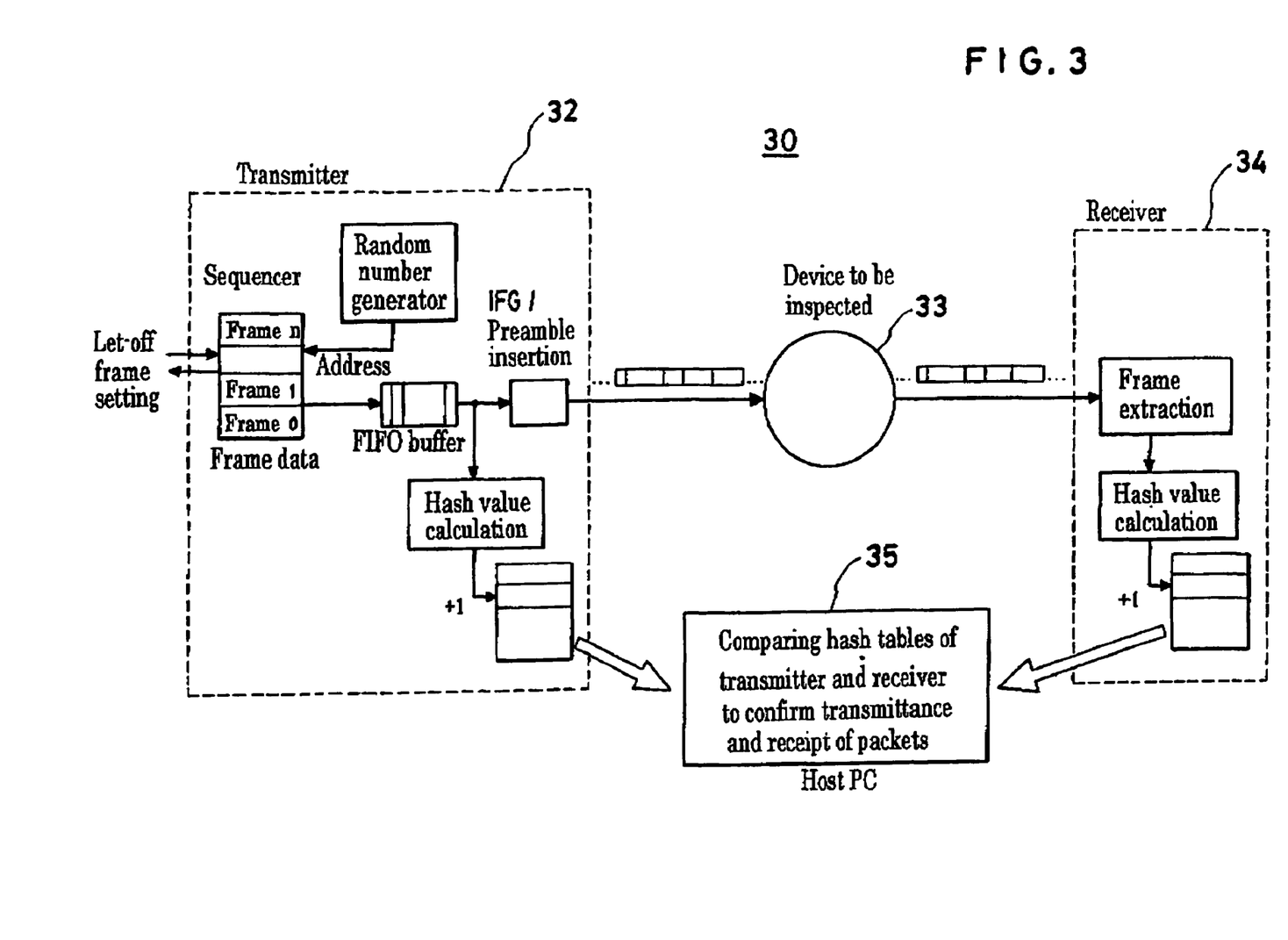
FIG. 3 is a schematic diagram showing a verification system for the functions of a URL filtering device in the case of verifying an inspection table using a host PC.
Figure 4:
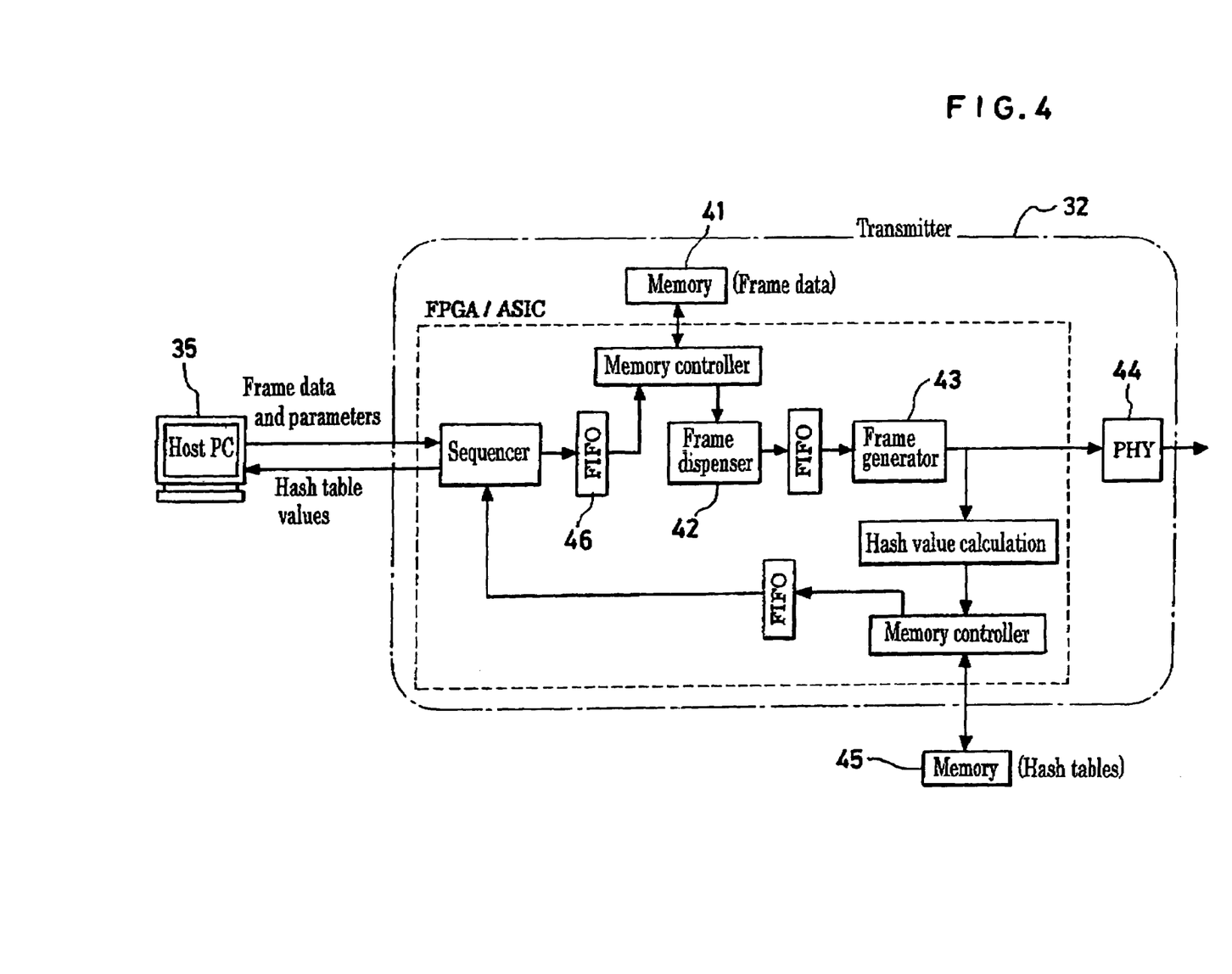
FIG. 4 is a block diagram showing a transmitter shown in FIG. 3.
Figure 5:
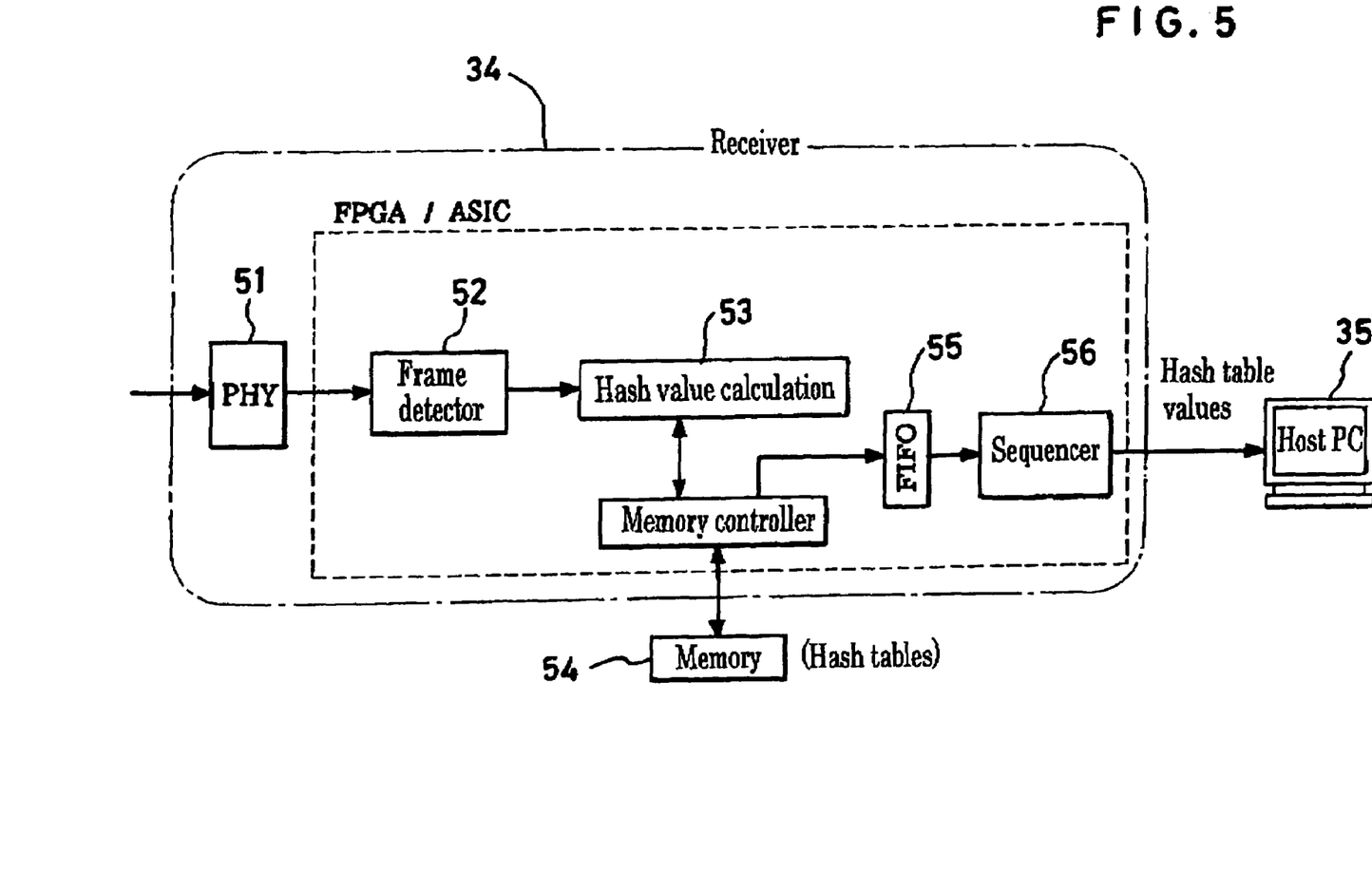
FIG. 5 is a block diagram showing a receiver shown in FIG. 3.

FIG. 3 shows a circuit configuration of a verification system 30 for the functions of a URL filtering device in the case of verifying an inspection table using a host PC in the system shown in FIG. 1. In particular, a block diagram of a transmitter 32 is shown in FIG. 4 and a block diagram of a receiver 34 is shown in FIG. 5. In the transmitter 32, frame data and parameters from the host PC 35 are stored in a memory 41. The parameters are concerning whether they are to be filtered, the sizes of an inter-frame gap and a preamble, packet sent frequency, etc. Appropriate ones from the frame data of the packets stored in the memory 41 are selected using a frame dispenser 42 according to random digits and transmitted to a frame generator 43. In the frame generator 43, an inter-frame gap and a preamble designated in accordance with the parameters from the host PC 35 are inserted and sent to a PHY chip 44. At this time. hash values of the packet frames simultaneously sent are calculated, a counter of the occurrence frequency for each hash value is incremented by 1, and the resultant values are recorded on a hash table 45 on the memory. After the completion of the transmission, the values on the hash table are transmitted to the host PC 35. The writing to and reading from the memory 41 are performed via a FIFO (First-In First-Out buffer) 46 when necessary for the purpose of adjusting the transfer rate.

In the receiver 34, the received data are received from a PHY chip 51 and, when a frame detector 52 detects that the data comprises a frame, a hash value is calculated at a hash value calculation section 53. An occurrence frequency counter for the calculated hash value on the hash table in the memory 54 is incremented by 1. After the completion of the receipt, the values on the hash table are transmitted to the host PC 35. The writing to and reading from the memory are performed via a FIFO 55 and a sequencer 56 when necessary for adjusting the transfer rate. In the host PC 35, the kinds of packets and occurrence frequencies of the hash values on the hash tables sent from the transmitter 32 and receiver 34 are compared and, if the packet is a packet to be filtered out, the packet is confirmed as being not received. If the packet is not a packet to be filtered out, the same number of packets is confirmed on the transmitter and on the receiver. With the mechanism mentioned above, it is possible to perform a high-speed inspection of a packet filter which permits a change in arriving order of the packet frames, using a system with a small memory size.

EXAMPLE 2

Figure 6:
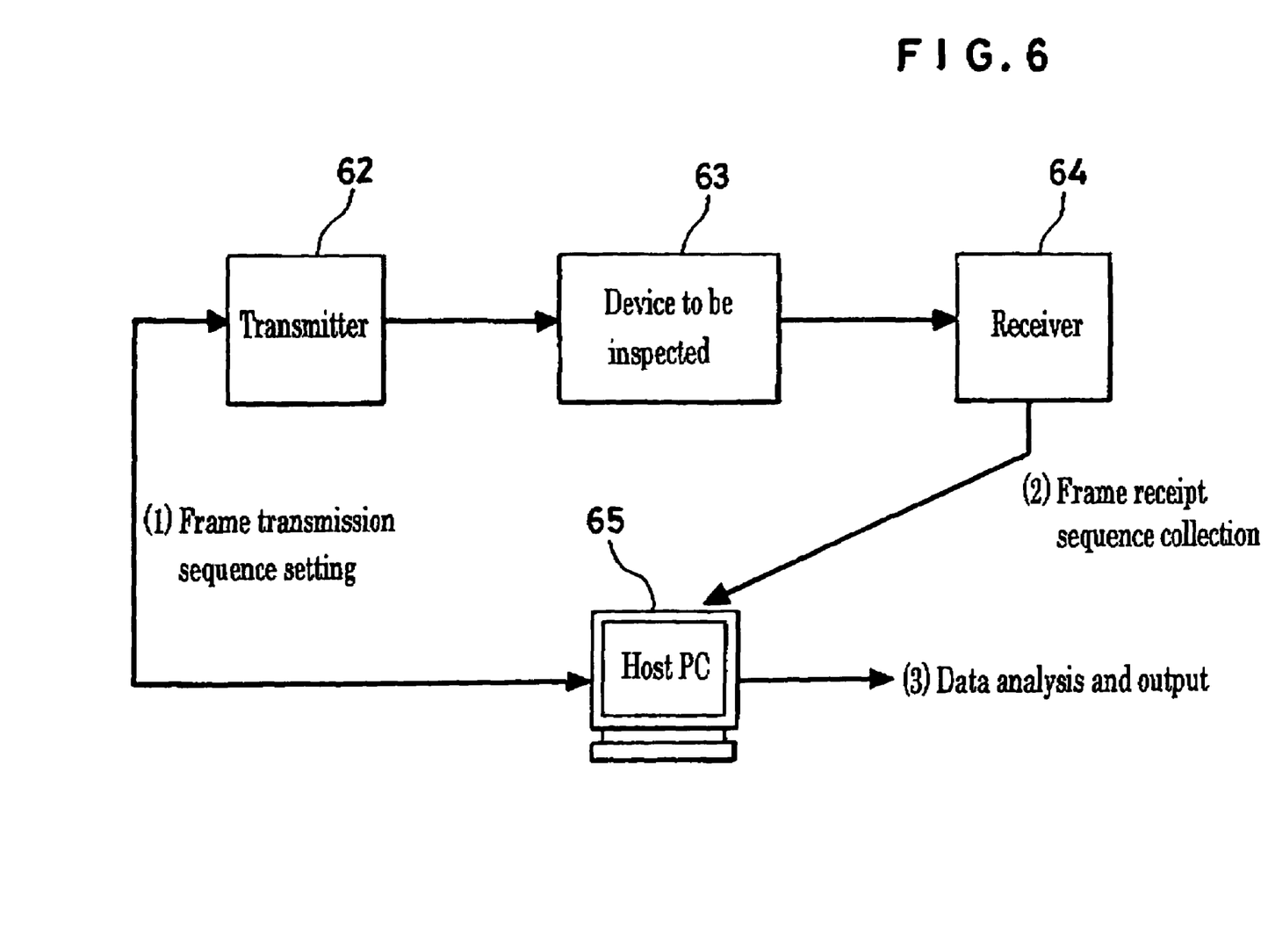
FIG. 6 is a schematic diagram showing a device for precisely producing and recording frame transmitting and receiving sequences.

A device for inspecting frame transmitting and receiving sequences will next be described FIG. 6 shows a schematic diagram of a device for producing and recording frame transmitting and receiving sequences that include frame data, an inter-frame gap and a preamble. In this device, since it is possible to analyze a frame sequence having the length of an inter-frame gap and the length of a preamble recorded therein, it is possible to inspect the behavior of a network device that receives data suffered from errors in the network. By analyzing the interval between the frames sent by the network device, it is also possible to investigate the cause of a decreased throughput. A host PC configures a frame to be transmitted and its sequence in a transmitter, obtains the sequences to sort the received frames from a receiver, analyzes data and provides an output.

Figure 7:
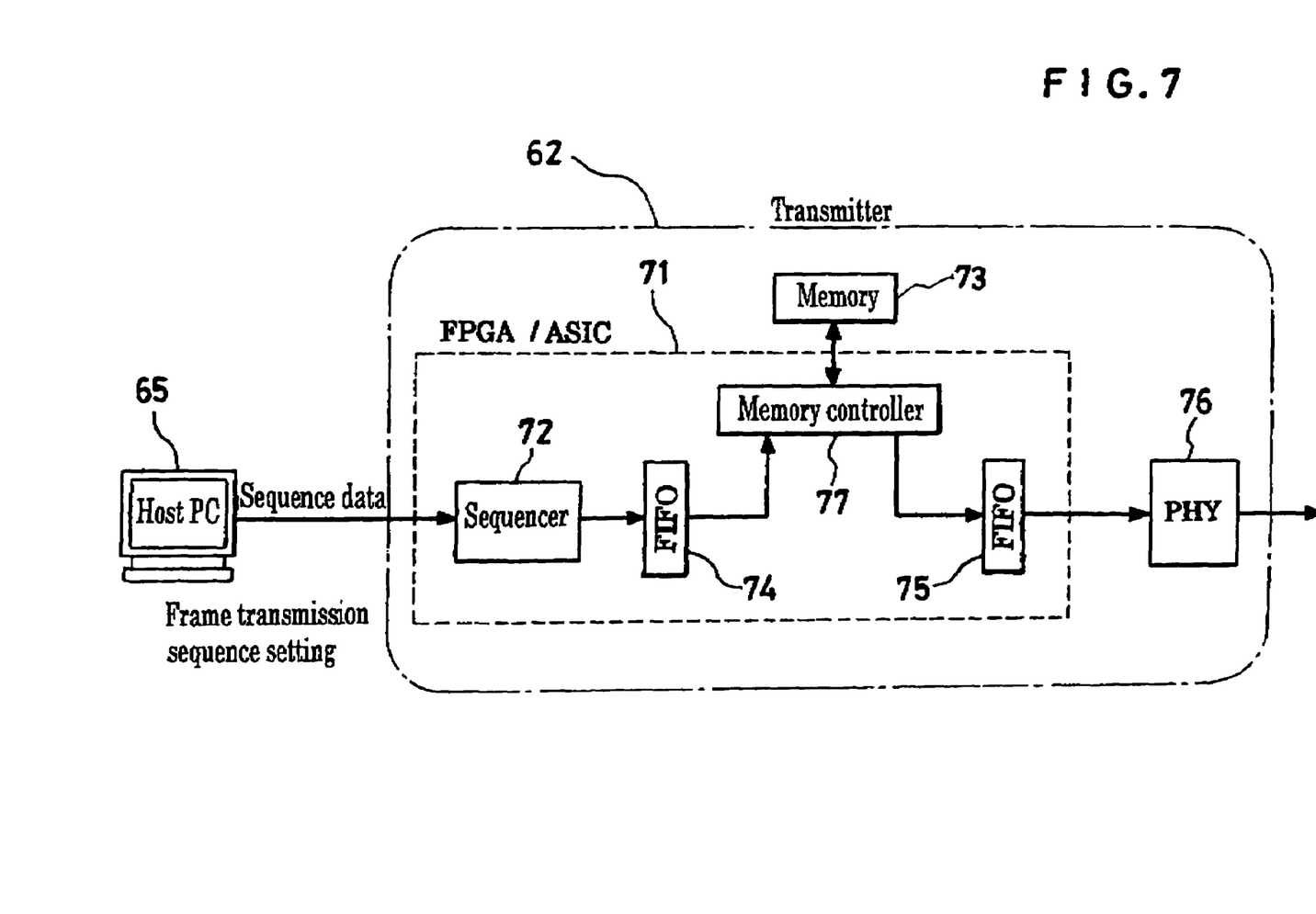
FIG. 7 is a block diagram showing a transmitter shown in FIG. 6.
Figure 8:
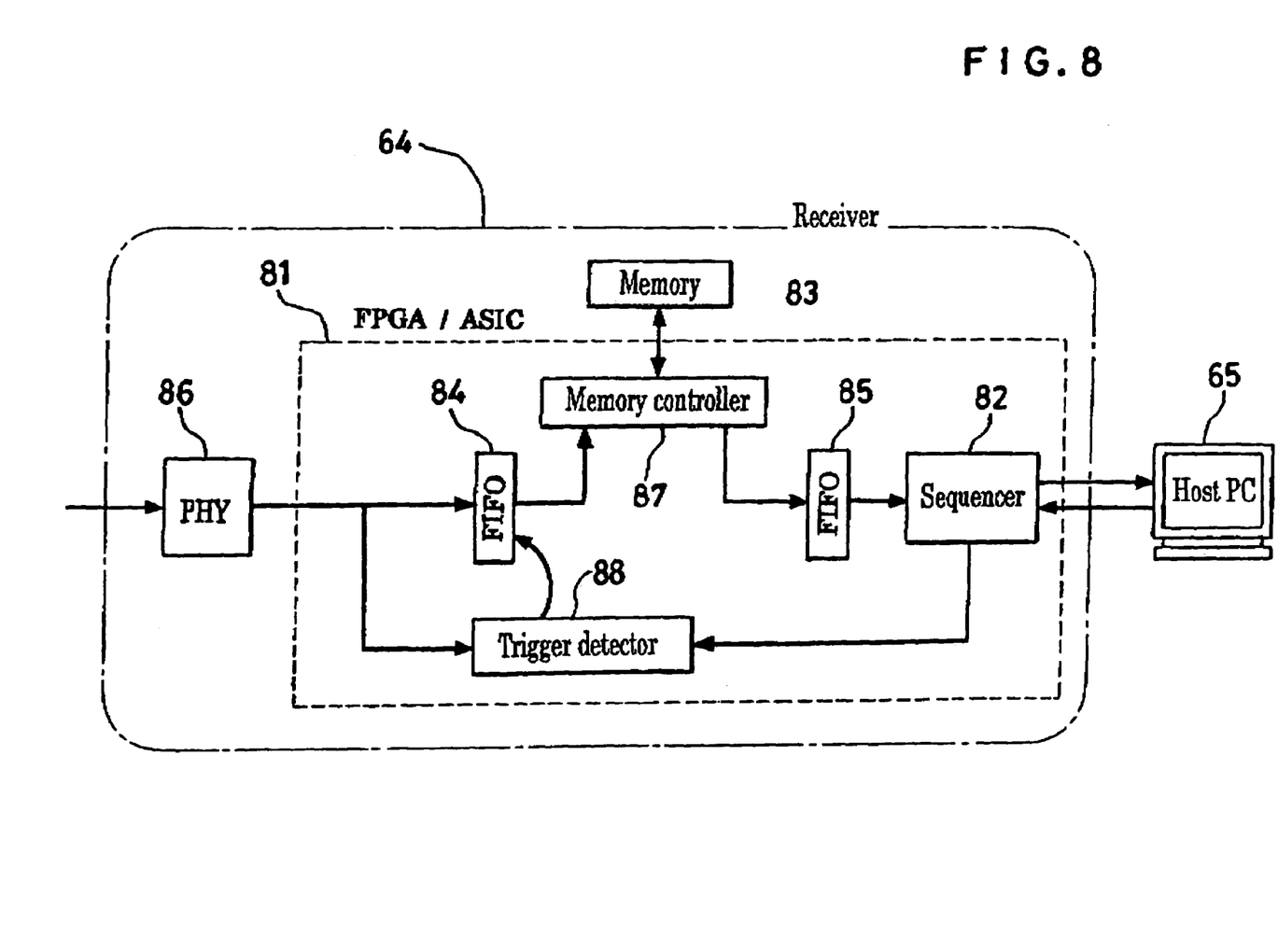
FIG. 8 is a block diagram showing a receiver shown in FIG. 6.

A block diagram of the transmitter 62 of the device shown in FIG. 6 is shown in FIG. 7 and a block diagram of the receiver 64 in FIG. 8. The receiver 64 starts measurement by a trigger signal. In FIG. 7, a host PC 65 configures a frame transmitted and its sequence through a sequencer 72 in an FPGA/ASIC 71, and the sequencer 72 stores in a memory 73 a sequence of a packet frame which precisely reflects up to a preamble and an inter-frame gap in accordance with the set frame and sequence. Though storage of the sequence may be done in the form of raw data of a packet sequence, in order to permit a long sequence, it may be redirected using an address of the packets stored in advance or redirected using a program generating the address. The sequence data stored are sent at once to a device 63 to be tested via a PHY chip 76 by a command from the host PC 65 after the receiver 64 become ready. The writing to and reading from the memory 73 are performed via FIFOs 74 and 75 and a memory controller 77 when necessary for adjusting the transfer rate.

In FIG. 8, data received by a PHY chip 86 are inspected first at a trigger detector 88. The trigger detector 88 has a data pattern implying an inspection start which is configured from a host PC 65 via a sequencer 82. Upon receipt of a data having the pattern, a trigger signal is generated and drives the inspection started. Following the start of inspection by the trigger detector, the data are stored in a memory 83 and, after completion of receipt of the data, the data are transmitted to the host PC 65. In the host PC 65, the data sent to the transmitter 62 and the data received from the receiver 64 are compared and inspected. The writing to and reading from the memory 73 are performed via FIFOs 84 and 85 and a memory controller 87 when necessary for adjusting the transfer rate. By the way, without storing raw data in the memory 83 as they are, a redirection procedure for compressing the amount of data through conversion of the data into a packet address registered in advance is made possible. Furthermore, an extension for making a continuous inspection for a long time is also made possible by making comparison of the received data with the frame transmitting sequence within an FPGA/ASIC 81.

EXAMPLE 3

Figure 9:
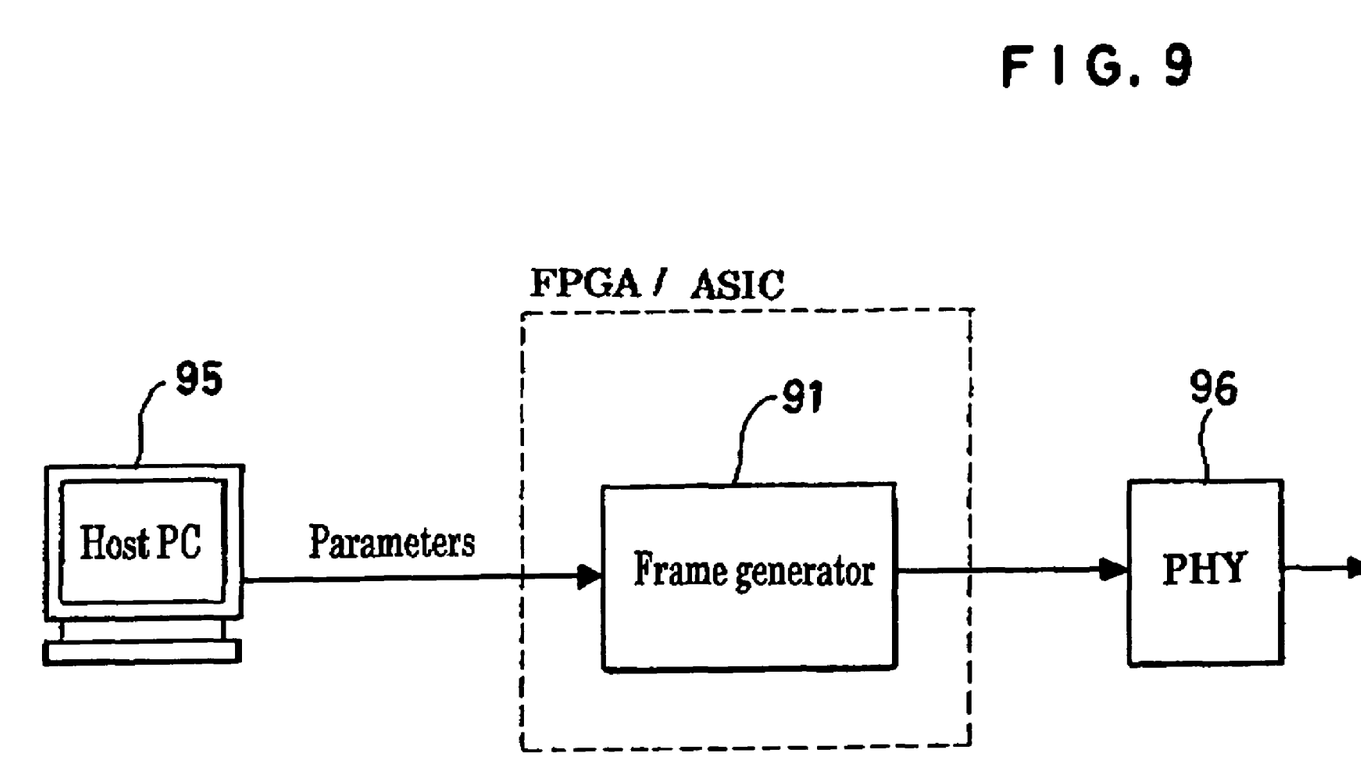
FIG. 9 is a block diagram showing a continuous packet production circuit for continuously producing frame data of a length set in advance.
Figure 10:
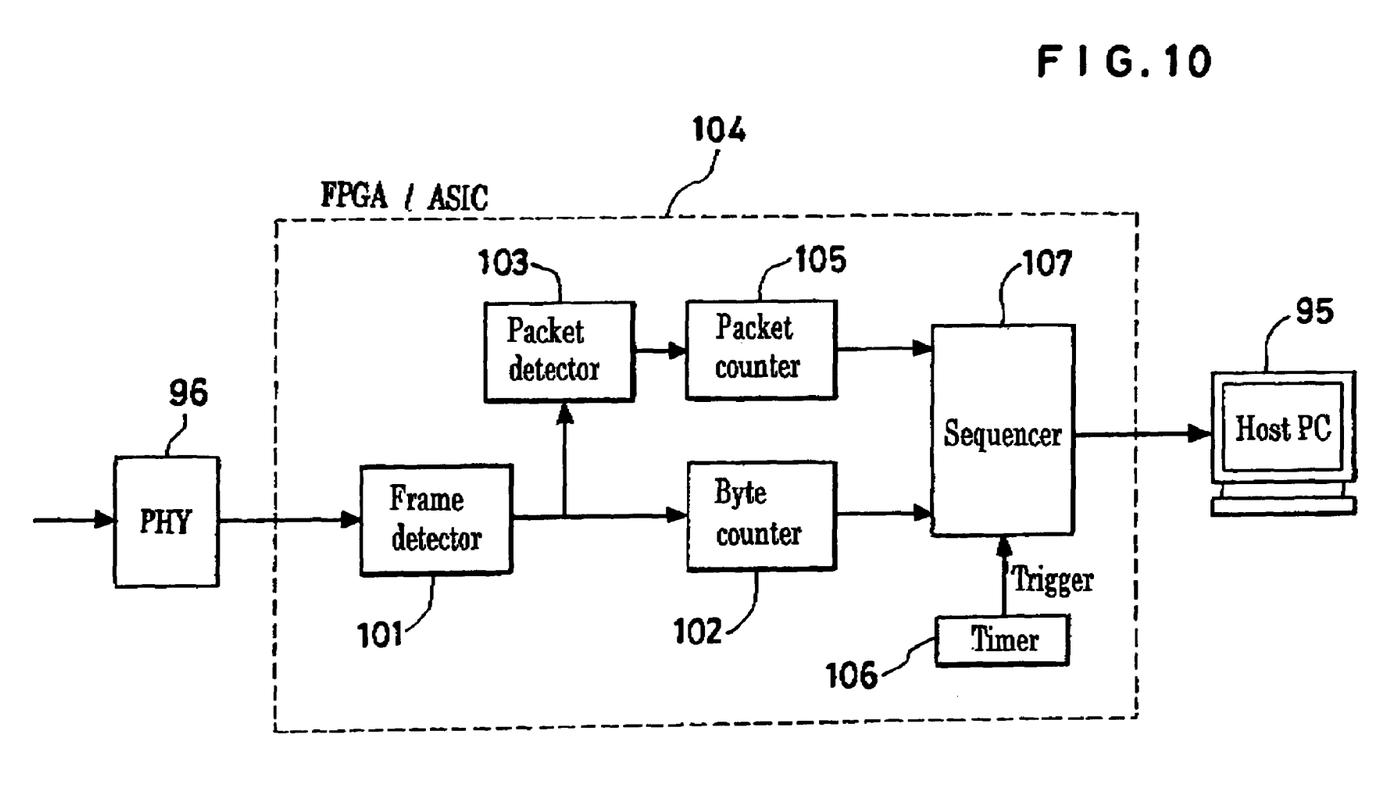
FIG. 10 is a block diagram showing a device for measuring the throughput and average packet length of a network device.

Next, a device for measuring a throughput and an average packet length will be described. FIG. 9 is a block diagram showing a transmitter of the device for measuring a throughput and an average packet length according to the present invention. FIG. 10 is a block diagram showing a receiver thereof.

The transmitter of FIG. 9 sets parameters on a packet sent from a host PC 95 to a frame generator 91, and the frame generator 91 continuously generates the packets after a sequence is designated using a PHY chip 96.

The receiver of FIG. 10 allows the data received from the PHY chip 96 to pass through a frame detector 101 formed in an FPGA or ASIC, the byte count of a frame received is recorded on a byte counter 102, packets are discriminated at a packet detector 103 and the discriminated packets are recorded using a packet counter 105. This measurement is made per unit time in accordance with a trigger signal from a timer 106, and a sequencer 107 outputs throughput data and an average packet length.

According to the technique of the present invention, as described above, since a circuit data necessary for the FPGA is written on a case-by-case basis and a communication media chip is directly operated with the circuit, a high-speed but economical operation is made possible. In addition a filtering test can also economically be made at high speed according to the technique of the present invention. Though there exists a report on an equipment that varies the communication protocol with a communication apparatus using an FPGA, there has been no report on network device testing equipment in which an evaluation is performed using both circuits on the transmitter side and receiver sides configured in pairs via a network. Furthermore, though there is an report on equipment which specifies the class of packets using a hash, there has been no description on a system for continuously inspecting the presence or absence of passage of packets using a hash, with circuits on the transmitter and receiver sides in network testing equipment configured in pairs.

In recent years, a URL filtering service by communication providers has been much in demand and nowadays main communication carriers have always been equipped with a service menu including the same. However, existing performance-testing equipment is a costly choice using an specific integrated circuit chips and having beforehand expected and limited performance measurement items. The present invention provides inexpensive equipment using an FPGA and capable of flexible high-performance measurement including an option for a DoS attack. Therefore, the present equipment promises a wide spread as a network load testing equipment for communication carriers and business enterprises of some degree of scale. In addition, the measurement items may be formulaic and, when many demands are promised, the equipment can be made in the form of an ASIC. Thus, the cost of the equipment can be reduced without taking away from flexibility and high-performance,

What is claimed is:

1. A network device testing equipment comprising:
a transmitter including a field programmable gate array;
a receiver including a field programmable gate array;
a transmission channel configured to connect the transmitter to the receiver via a device to be inspected; and
a host computer to
set an inspection packet and a parameter to the transmitter,
compare data from the transmitter and receiver and calculate and collect inspection tables,
wherein the field programmable gate arrays of the transmitter and receiver respectively include integrated circuitry to generate a packet pattern and to receive packets,
the host computer sets in each inspection packet, as the parameter, a flag to indicate to the receiver whether or not a hash value has been calculated for that inspection packet at the transmitter,
the field programmable gate array in the transmitter, which is connected to a physical layer of a network, directly produces a series of packets including the inspection packets, transmits the series of packets to the device to be inspected via the physical layer in accordance with the parameter, and calculates hash values corresponding to the inspection packets in accordance with the parameter and using a hash function, each hash value having a one-to-one correspondence with a respective packet, each of the packets having different filtering keys,
the field programmable gate array of the transmitter records a frequency of occurrence of the calculated hash values in an inspection table including the calculated hash values as addresses,
the field programmable gate array of the receiver, which is connected to the physical layer of the network, receives inspection packets from the device to be inspected via the physical layer, uses a hash function to calculate hash values from the received inspection packets, each calculated hash value having a one-to-one correspondence with a respective received packet, the field programmable gate array of the receiver recording a frequency of occurrence of the calculated hash values in an inspection table of the receiver, the hash values being included in the inspection table of the receiver as addresses, and
the host computer compares the inspection table of the transmitter with the inspection table of the receiver.

2. The network device testing equipment according to claim 1, wherein the transmitter further includes a plurality of field programmable gate arrays connected to the physical layer of the network to switch the arrays or a partially rewritable field programmable gate array to switch a circuit for packet sending.

3. The network device testing equipment according to claim 2, wherein the field programmable gate arrays are a device including a circuit that can be programmed by a function block as a programming unit or using a semiconductor integrated circuit constituting an application specific integrated circuit.

4. The network device testing equipment according to claim 1, wherein the field programmable gate arrays are provided with a packet generation section and a received packet checkup section to have an inspection function to compare a generated packet with a received packet.

5. The network device testing equipment according to claim 4, wherein the field programmable gate arrays are a device including a circuit that can be programmed by a function block as a programming unit or using a semiconductor integrated circuit constituting an application specific integrated circuit.

6. The network device testing equipment according to claim 1, wherein the transmitter randomizes frame data, calculates hash values of transmitted data and compares occurrence frequencies of each hash value on transmitting and receiving sides to confirm presence or absence of arrival of packets.

7. The network device testing equipment according to claim 6, wherein the field programmable gate arrays are a device including a circuit that can be programmed by a function block as a programming unit or using a semiconductor integrated circuit constituting an application specific integrated circuit.

8. The network device testing equipment according to claim 1, wherein the host computer alters a part of data irrelevant to network device testing of one of the packets, when a same hash value corresponds to different packets having different filtering keys; and
adds a new part to the packet or for altering a hash function so that different packets have different hash values,
wherein the part of data irrelevant to network device testing is a part of data in a packet from which a filtering key has been removed, the filtering key indicating a part of data determining whether a corresponding packet is to be filtered.

9. The network device testing equipment according to claim 8, wherein the field programmable gate arrays are a device including a circuit that can be programmed by a function block as a programming unit or using a semiconductor integrated circuit constituting an application specific integrated circuit.

10. The network device testing equipment according to claim 1, wherein the field programmable gate arrays are a device including a circuit that can be programmed by a function block as a programming unit or using a semiconductor integrated circuit constituting an application specific integrated circuit.

* * * * *